No. 831,710. PATENTED SEPT. 25, 1906.
A. P. DAY.
MIRROR ATTACHMENT FOR LADIES' HATS.
APPLICATION FILED FEB. 1, 1906.
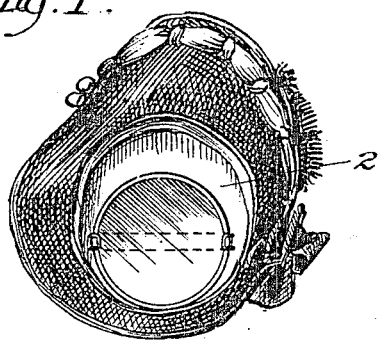
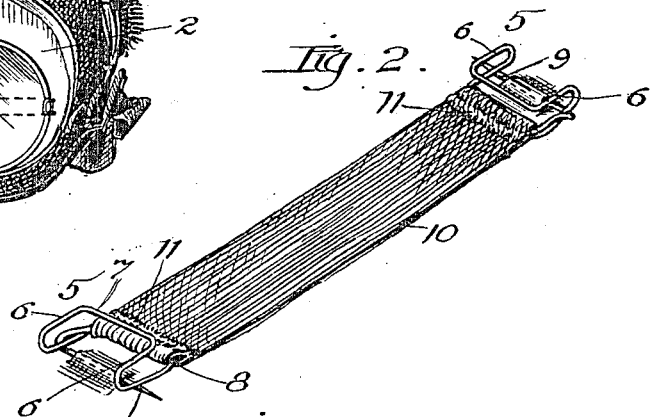
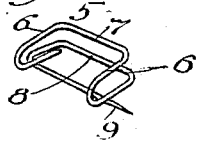
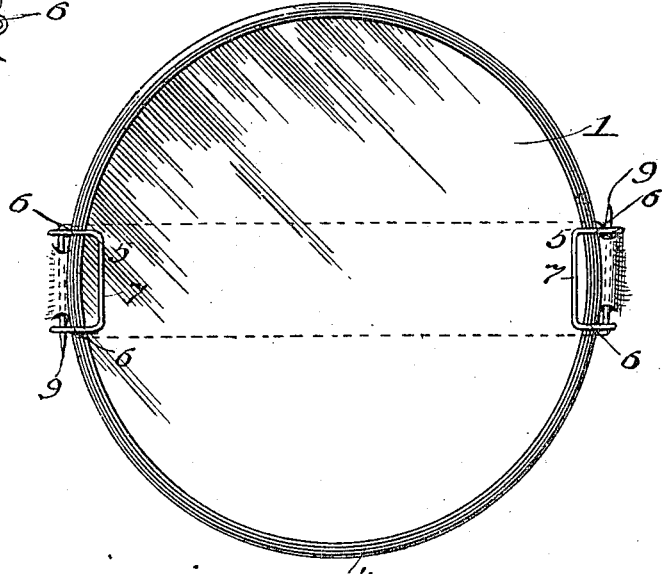
Witnesses:
Frank J. Blanchard
George L. Chindahl
Inventor:
Albertine P. Day
By Luther L. Miller
Attorney

UNITED STATES PATENT OFFICE.

ALBERTINE P. DAY, OF CHICAGO, ILLINOIS.

MIRROR ATTACHMENT FOR LADIES' HATS.

No. 831,710.  Specification of Letters Patent.  Patented Sept. 25, 1906.

Application filed February 1, 1906. Serial No. 298,909.

*To all whom it may concern:*

Be it known that I, ALBERTINE P. DAY, a citizen of the United States, residing at Chicago, in the county of Cook and State of Illinois, have invented certain new and useful Improvements in Mirror Attachments for Ladies' Hats, of which the following is a specification.

The object of this invention is the provision of means for supporting a mirror within the crown of a lady's hat.

In the accompanying drawings, Figure 1 is a perspective view of a lady's hat, showing a mirror supported within the crown thereof by my improved means. Fig. 2 is a perspective view of said means apart from the mirror. Fig. 3 is a front elevation of a mirror with said attaching means associated therewith. Fig. 4 is a transverse central section through the mirror. Fig. 5 is a detail view of one of the fastening-clasps.

The embodiment herein shown of this invention comprises a mirror 1 of the same shape—to wit, circular—as the interior of the hat-crown 2. Preferably the mirror 1 is provided with a paper backing 3, which backing is held in place and the edge of the mirror given a finished appearance by an annular flanged binding-ring 4, the flanges of which ring overlie the edges of the mirror 1 and the backing 3.

The means for attaching the mirror to the hat comprises two clasps 5, each of which has means adapted to engage the mirror and means to engage the hat. In the present instance each clasp 5 is formed of a piece of wire bent to provide two loops 6, adapted to overlie one edge of the mirror 1. Said loops are connected across the face of the mirror by the bar 7 and across the back of the mirror by the bar 8. One end of the wire forming the clasp is suitably bent and pointed to form a pin 9, adapted to be thrust into the material of which the hat-crown is made. The clasps 5 are held in releasable engagement with diametrically opposite points upon the periphery of the mirror 1 by means of a strip 10 of elastic material, said strip lying at the rear side of the mirror and its ends being connected with the connecting-bars 8 of said clasps in any suitable way, as by means of a hem 11 taken around each of said bars.

In order to obtain as large a reflecting-surface as possible, the mirror ordinarily is made almost as large as the interior size of the hat-crown will permit. Owing to the consequent lack of space within the hat-crown, it is generally impracticable to connect the clasps 5 with the mirror 1 before inserting the latter in the crown. In use, therefore, the clasps 5 (yieldingly united by the elastic strip 10) are first attached to the hat-crown by thrusting the pins 9 into the material of the upper wall of the hat-crown at diametrically opposite points upon the under side thereof. The clasps 5 are then tilted sufficiently to enable the user to slip the mirror into the loops of said clasps, as shown in Fig. 3. The mirror may be readily removed from the hat by a reversal of the process just described. The clasps 5 hold the mirror 1 securely in place without unduly extending over or covering the face thereof.

I claim as my invention—

1. In a mirror attachment for hats, in combination, a mirror; and two clasps, each comprising a loop adapted to fit over the edge of said mirror and a member adapted to engage the hat.

2. In a mirror attachment for hats, in combination, a mirror; and two clasps flexibly connected together and adapted to engage opposite sides of the mirror, said clasps having means to engage the hat.

3. In a mirror attachment for hats, in combination, a mirror; two clasps each comprising a loop adapted to fit over the edge of said mirror and a pin adapted to engage the hat; and means for connecting said clasps together.

4. In a mirror attachment for hats, in combination, a mirror; two clasps each comprising a loop adapted to fit over the edge of said mirror and a pin adapted to engage the hat; and flexible means for connecting said clasps together.

5. In a mirror attachment for hats, in combination, a mirror; two clasps each formed from wire, and comprising two loops adapted to fit over the edge of the mirror, a bar for connecting one end of said loops, a bar for connecting the other end of said loops, and a pin adapted to engage the hat; and a strip of elastic material connecting together the last-mentioned bar of said clasps.

ALBERTINE P. DAY.

Witnesses:
L. L. MILLER,
GEORGE L. CHINDAHL.